W. G. MILLS AND C. T. PACKARD.
CHAMBER USED IN THE MANUFACTURE OF SULFURIC ACID.
APPLICATION FILED MAR. 4, 1919.
1,312,742.
Patented Aug. 12, 1919.
2 SHEETS—SHEET 1.
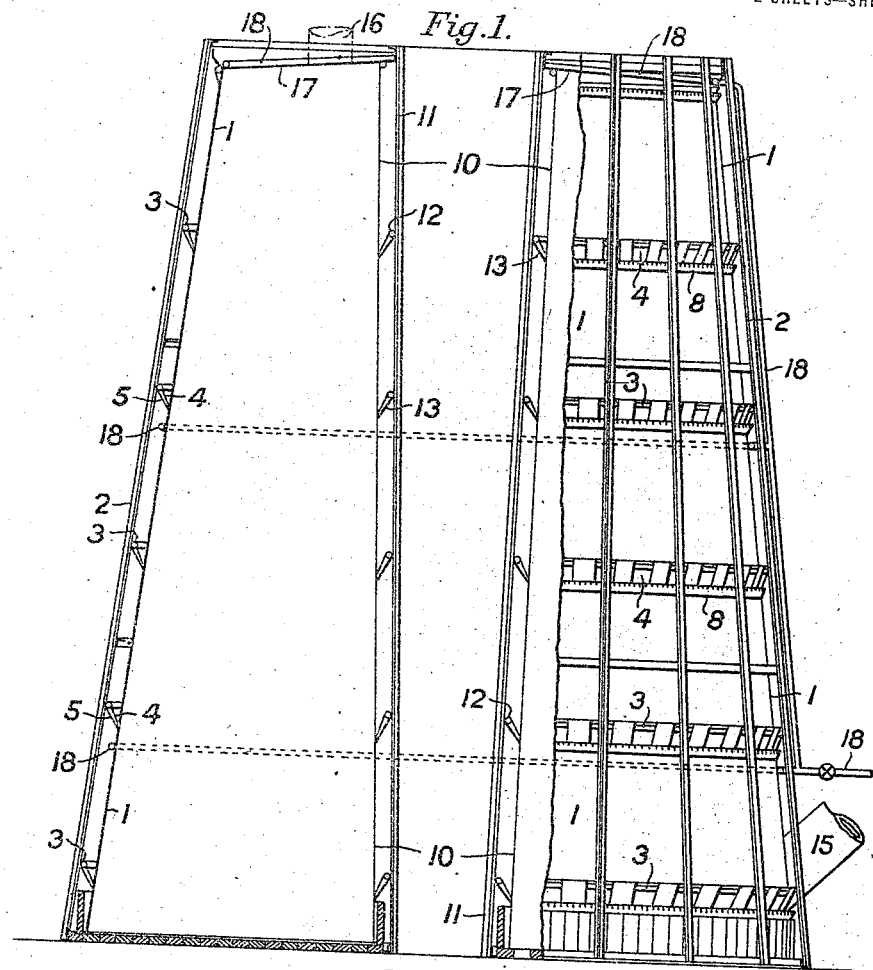
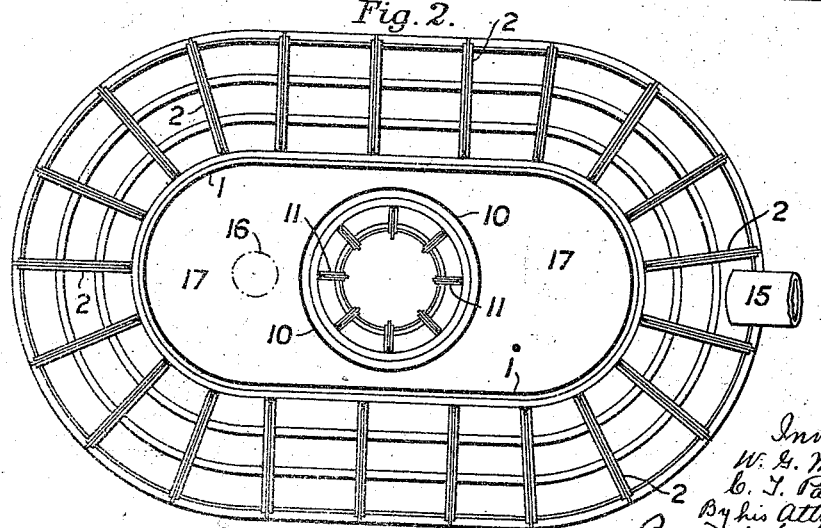

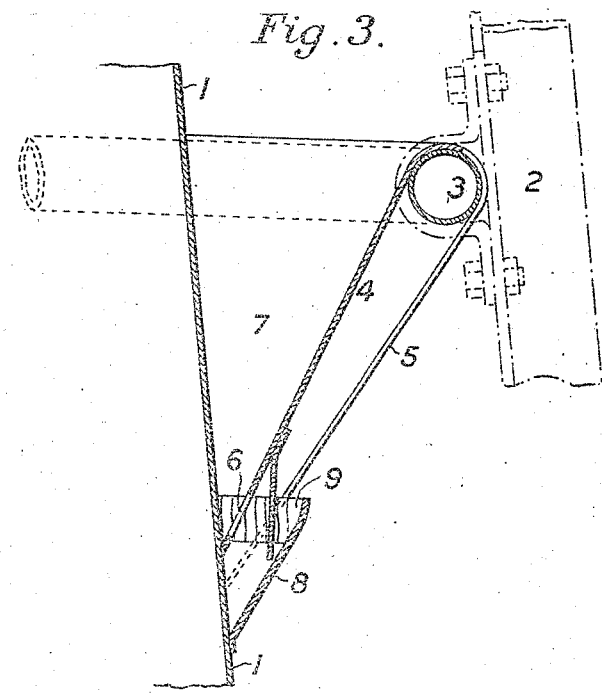
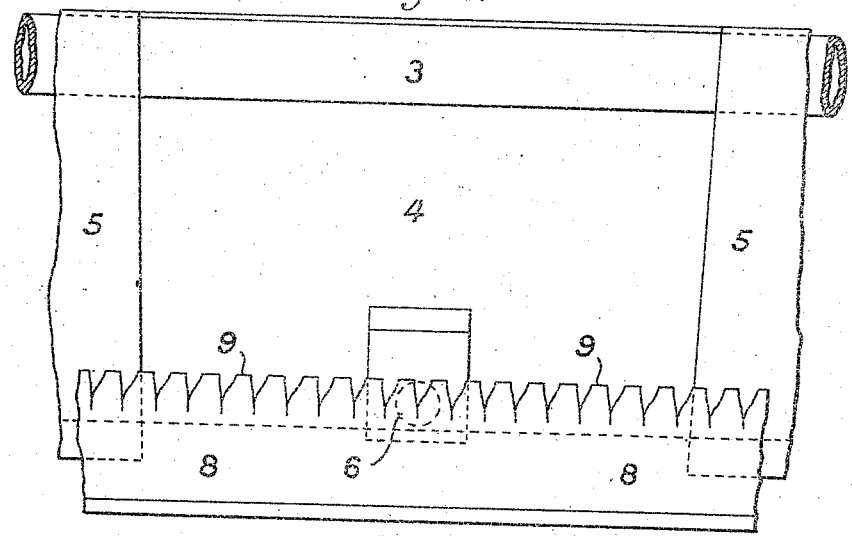

UNITED STATES PATENT OFFICE.

WILLIE GEORGE MILLS AND CHARLES TURNER PACKARD, OF IPSWICH, ENGLAND, ASSIGNORS TO EDWARD PACKARD AND COMPANY, LIMITED, OF IPSWICH, ENGLAND.

CHAMBER USED IN THE MANUFACTURE OF SULFURIC ACID.

1,312,742.  Specification of Letters Patent.  Patented Aug. 12, 1919.

Original application filed July 31, 1918, Serial No. 247,572. Divided and this application filed March 4, 1919. Serial No. 280,669.

*To all whom it may concern:*

Be it known that we, WILLIE GEORGE MILLS and CHARLES TURNER PACKARD, subjects of the King of Great Britain, both residing at Bramford Works, Ipswich, England, have invented new and useful Improvements in the Chambers Used in the Manufacture of Sulfuric Acid, of which the following is a specification.

This invention relates to apparatus for the manufacture of sulfuric acid of the general type described in the specification of our Patent No. 1,112,546.

In our application for U. S. patent, filed July 31, 1918, No. 247,572, of which this application is a division, a lead chamber is described of the shape of a frustum of a pyramid or preferably of a cone which is the limiting case of a pyramid and providing the chamber with a cooling shaft or tube.

According to this invention the chamber is of the shape of the frustum of an elliptical cone or an approximately elliptical cone with its sides (in the direction of its longest axis) parallel for a portion of their length, and a cooling shaft or tube which may be supported by rings connected to the framework and to the shaft to form troughs which may also be utilized for cooling the inside of the shaft by the flow of water.

The shaft may be of the shape of a frustum of a cone, the walls sloping inward from top to bottom in the reverse way to that of the chamber itself.

The internal cooling shafts may be cooled in the manner described in the above mentioned patent.

Preferably, however, in place of drawing off the water from each trough through drain pipes, the water is allowed to pass through orifices into a gutter surrounding the trough, while the gutter is provided at the top with notches through which the water trickles.

The gas is preferably delivered into the chamber through a single pipe set at such an angle that the gas is directed toward the floor of the chamber.

The invention is illustrated in the accompanying drawings in which Figure 1 is a sectional elevation, Fig. 2 is a plan of Fig. 1, and Figs. 3 and 4 are respectively a section and elevation of the gutter and its support.

In the drawings, 1 is the chamber carried by a framework 2. 3 are rings which carry lead rings 4, the top portion of the double strip forming the ring 4, is solid except for orifices 6 and forms a trough 7 (see Fig. 3) and its edges are burned both to the chamber wall and to the ring 3; the lower portion 5 of the strip is cut away at intervals and its edges are also burned to the chamber wall and to the ring 3. 8 is a gutter surrounding the bottom of the trough 7; the top edge of the gutter is saw cut and the teeth 9 so formed are then twisted at an angle of 45°.

10 is the central cooling shaft carried by framework 11 and provided with rings 12 and 13 similar to the rings 3 and 4, and also with gutters similar to the gutters 8.

15 is the inlet for the gas which is directed toward the floor of the chamber and 16 is the outlet for the gas.

Water is supplied to the ceiling 17 of the chamber and shaft or also if desired at intervals by a pipe 18 and the ceiling 17 may slope from the central shaft to the wall of the chamber.

What we claim is:—

1. In apparatus for the manufacture of sulfuric acid, the combination of a chamber to which gas to be treated is admitted and which is elliptical in cross section and tapers from bottom to top, a cooling shaft within the chamber, means for causing water to flow down the outer surface of the chamber wall, and means for causing water to flow down the inner surface of the shaft.

2. In apparatus for the manufacture of sulfuric acid, the combination of a chamber to which gas to be treated is admitted and which is elliptical in cross section and tapers from bottom to top, a cooling shaft within the chamber which tapers from top to bottom, means for supplying a cooling agent to the outside of the chamber, and means for supplying a cooling agent to the inside of the shaft.

In testimony that we claim the foregoing as our invention, we have signed our names this 10th day of February 1919.

WILLIE GEORGE MILLS.
CHARLES TURNER PACKARD.